Oct. 15, 1929.  E. E. DRUMM  1,732,004

TEAKETTLE HANDLE

Filed Sept. 26, 1928

Inventor:
Elmer E. Drumm

Patented Oct. 15, 1929

1,732,004

UNITED STATES PATENT OFFICE

ELMER E. DRUMM, OF MANITOWOC, WISCONSIN, ASSIGNOR TO ALUMINUM GOODS MFG. CO., OF MANITOWOC, WISCONSIN

TEAKETTLE HANDLE

Application filed September 26, 1928. Serial No. 308,543.

This invention pertains to improvements in cooking utensils, and more particularly teakettles and similar vessels provided with a removable cover, and a hinged handle.

The primary object of the present invention resides in the provision of improved means for retaining the cover on the vessel when the same is tilted to pouring position.

Incidental to the foregoing, it is a more specific object to provide a handle provided with efficient means, cooperating with the cover, to retain the same upon the vessel when the latter is tilted to pouring position, and which is swung out of the way to allow ready removal of the cover when the handle is swung to rest upon the vessel.

With the above and other objects in view, which will appear as the description proceeds, the invention resides in the novel construction, combination and arrangement of parts, substantially as hereinafter described and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

Figures 1, 2:
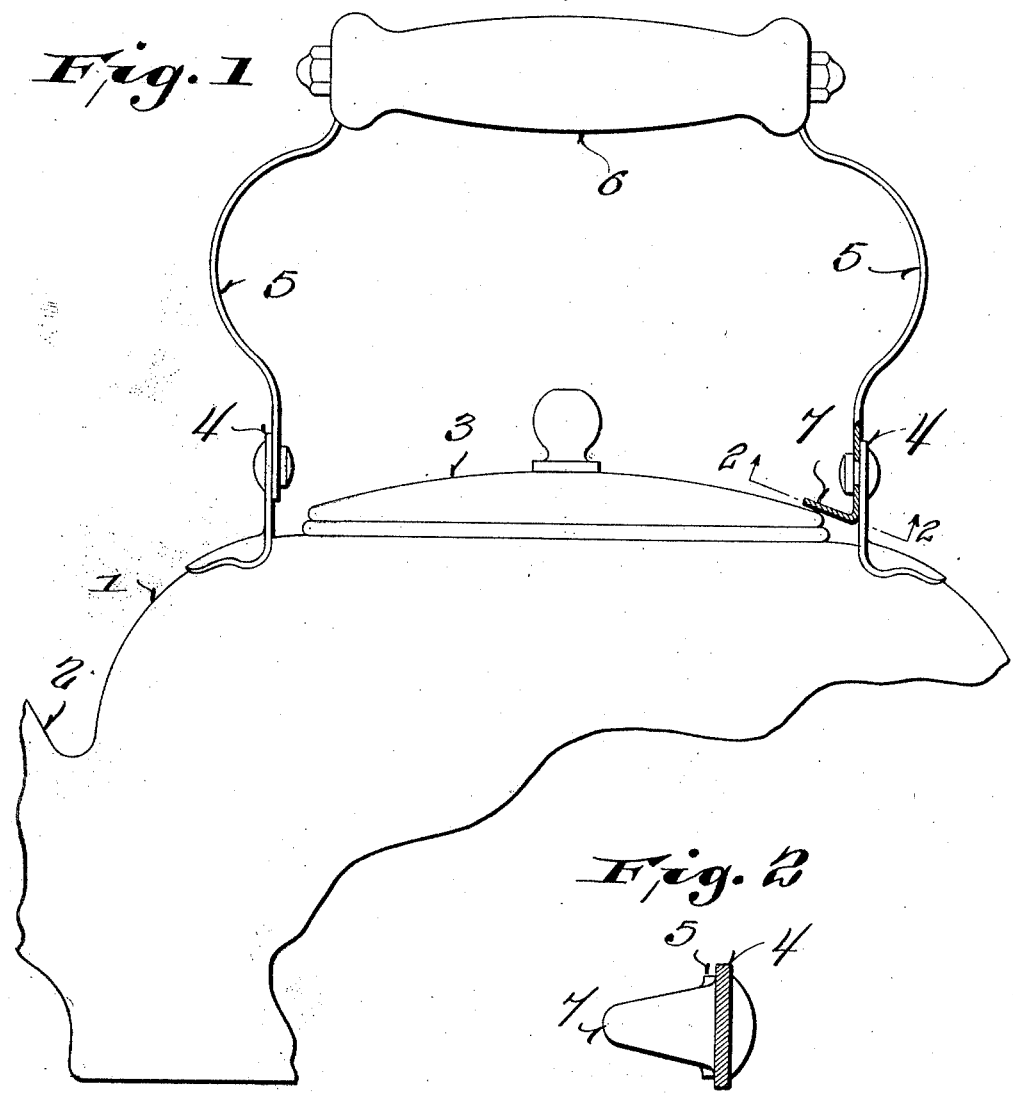
Figure 1 is an elevational view of a portion of a conventional vessel provided with the present invention, parts being broken away and in section to more clearly illustrate the structural features.
Figure 2 is a detailed section taken on the line 2—2 of Figure 1.

Referring now more particularly to the accompanying drawings, the numeral 1 designates a conventional tea-kettle provided with the usual spout 2, and a removable cover 3. Secured to the vessel in any suitable manner, and positioned adjacent the opposite sides of the cover, and in alinement with the spout, is a pair of ears 4 to which are pivoted side arms 5 of a U-shaped handle provided with the usual grip 6.

Projecting from the lower extremity of one of the arms 5, and in the present instance formed integral therewith, is a lip 7 which extends slightly over the edge of the cover 3, and closely adjacent thereto, when the handle is in vertical position.

In operation it will be obvious that as the vessel is tilted to pouring position, the cover will be prevented from accidentally tilting off of the vessel, due to the angle of the inclination, by engagement of the lip 7 with the cover, it being understood that the lip 7 is formed on the arm positioned at the opposite side of the vessel from its pouring spout.

While the cover may be readily removed when the handle is in substantially vertical position, by first raising it slightly at the opposite side from the tongue 7, to allow the cover to be withdrawn from under the tongue, it will also be readily seen that as the handle is swung downwardly toward the vessel, the tongue will move away from the cover and allow its ready removal without special care or effort.

From the foregoing, it will be seen that a very simple and efficient structure has been provided to retain a removable cover upon a vessel as the latter is tilted to pouring position, and which is swung out of the way so as not to interfere with removal of the cover when desired. It will also be appreciated that because of the simplicity of the arrangement provided, the same may be provided upon conventional types of vessels at practically no additional cost, whereas heretofore various structures of cover retainers required additional operation in attaching.

I claim:—

A vessel provided with a removable cover, spaced ears secured to said vessel adjacent opposite sides of said cover, a U-shaped handle having its arms pivoted to said ears, and a lip integral with and projecting laterally from the lower extremity of one of said arms to retain said cover upon said vessel when the latter is tilted to pouring position.

In testimony that I claim the foregoing I have hereunto set my hand at Manitowoc, in the county of Manitowoc and State of Wisconsin.

ELMER E. DRUMM.